US011069381B1

(12) United States Patent
Prater et al.

(10) Patent No.: US 11,069,381 B1
(45) Date of Patent: Jul. 20, 2021

(54) AUTOMATED SENSOR DATA RETENTION

(71) Applicant: Amazon Technologies, Inc., Seattle, WA (US)

(72) Inventors: Alexander Clark Prater, Seattle, WA (US); Ameet Nirmal Vaswani, Bellevue, WA (US); Natalie Thuy-Tien Nguyen, Bellevue, WA (US); Joseph Papa, Vashon, WA (US); Gregory Martin, Des Moines, WA (US); Ming-Hsiu Wang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/391,654

(22) Filed: Dec. 27, 2016

(51) Int. Cl.
| G11B 27/19 | (2006.01) |
| G06Q 10/08 | (2012.01) |
| H04N 5/91 | (2006.01) |
| G06K 9/00 | (2006.01) |
| H04L 12/24 | (2006.01) |
| H04N 5/14 | (2006.01) |
| H04N 5/225 | (2006.01) |
| H04N 5/77 | (2006.01) |
| H04N 9/80 | (2006.01) |

(52) U.S. Cl.
CPC .......... *G11B 27/19* (2013.01); *G06K 9/00744* (2013.01); *G06K 9/00771* (2013.01); *G06Q 10/087* (2013.01); *H04N 5/91* (2013.01); *H04L 41/0813* (2013.01); *H04N 5/144* (2013.01); *H04N 5/225* (2013.01)

(58) Field of Classification Search
CPC .............. H04N 5/225; H04N 21/47217; H04L 41/0813; G06F 11/1456; G06N 5/046; G08B 25/006; G06Q 10/00; G06Q 10/087; G06Q 10/0639
USPC ............... 386/223, 241; 340/539.17; 702/19; 706/58; 709/223; 711/162
See application file for complete search history.

(56) References Cited

U.S. PATENT DOCUMENTS

| 9,037,821 | B1* | 5/2015 | Shah ..................... G06F 3/0655 |
| | | | 711/162 |
| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 10,318,917 | B1* | 6/2019 | Goldstein ............ G06Q 20/208 |
| 10,445,676 | B2* | 10/2019 | Moriwaki .......... G06Q 10/0639 |
| 2008/0281951 | A1* | 11/2008 | Branam ............ G06F 17/30038 |
| | | | 709/223 |
| 2010/0191697 | A1* | 7/2010 | Fukumoto ............. A61B 5/1116 |
| | | | 706/54 |
| 2013/0284806 | A1 | 10/2013 | Margalit |

(Continued)

*Primary Examiner* — Robert Chevalier
(74) *Attorney, Agent, or Firm* — Lee & Hayes, P.C.

(57) ABSTRACT

This disclosure describes techniques for utilizing sensor data to automatically determine the results of events within a system. Upon receiving sensor data indicative of an event, the techniques may analyze the sensor data to determine a result of the event, such as that a particular user associated with a user identifier selected a particular item associated with an item identifier. The techniques described herein may determine when sensor data is to be stored for a default amount of time, and when sensor data is to be stored for a greater amount of time. By retaining data in an intelligent manner, the system is able to function accurately without unduly taxing storage constraints.

22 Claims, 7 Drawing Sheets

(56) References Cited

U.S. PATENT DOCUMENTS

2014/0313032 A1* 10/2014 Sager ............... H04Q 9/00
 340/539.17
2016/0071549 A1* 3/2016 von Sneidern ...... G11B 27/031
 386/241

* cited by examiner

AUTOMATED SENSOR DATA RETENTION

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility. Doing so, however, may involve acquisition of large amounts of sensor data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
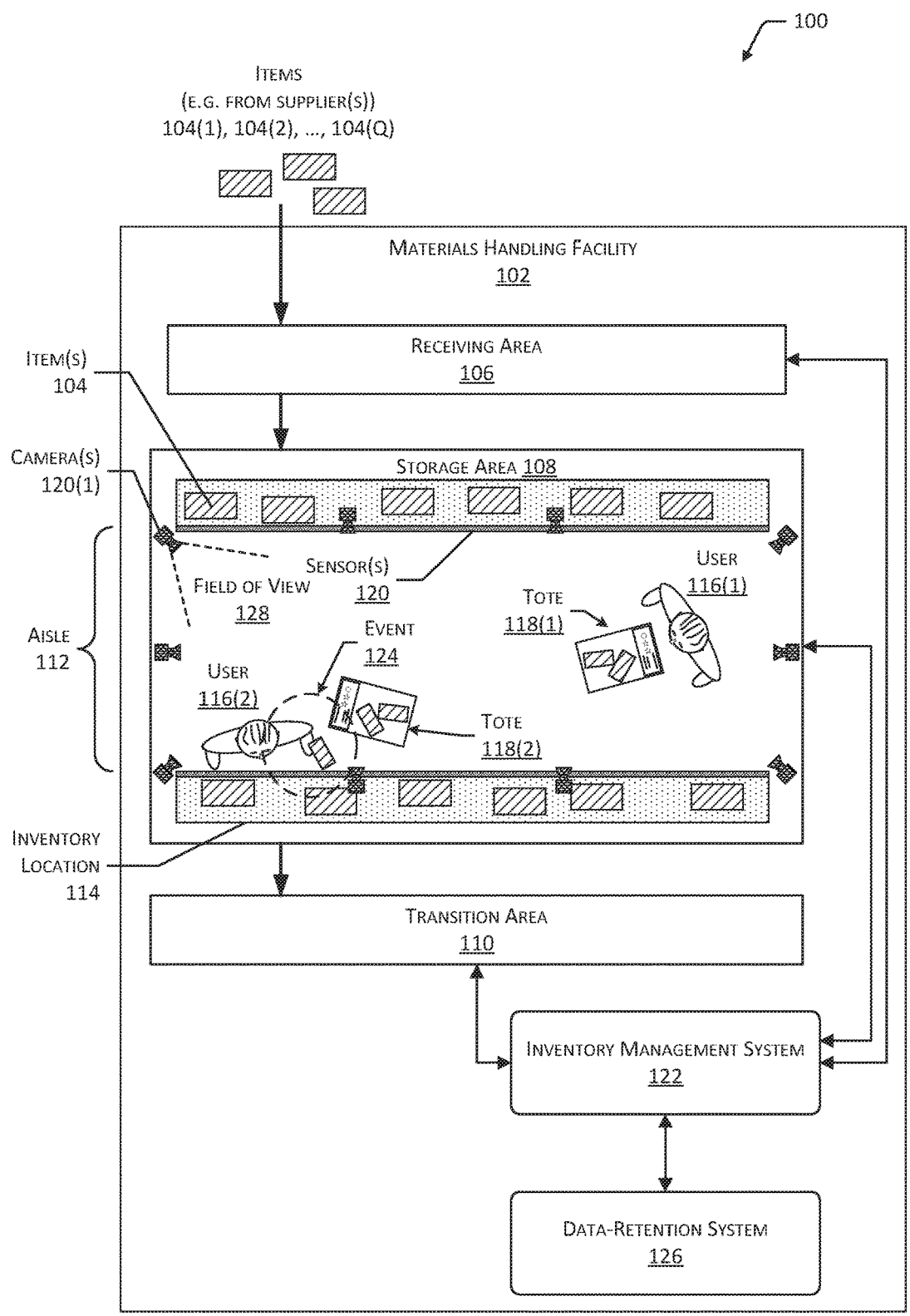
FIG. 1 is a block diagram of a materials handling facility that includes sensors and an inventory management system configured to generate output regarding events occurring in the facility using the sensor data. The events may include, for example, a user picking an item or returning an item. The diagram also includes a data-retention system that functions to determine which portions of the sensor data to delete after a default amount of time and which portions of the sensor data to store for longer periods of time.

This disclosure describes systems and techniques for storing acquired sensor data and determining, from the stored sensor data, one or more subsets of the data for storing for greater amounts of time. In some instances, the sensor data is acquired for the purpose of detecting events occurring within a materials handling facility (facility) and updating virtual shopping carts of respective users based on the detected events. The facility may include, or have access to, an inventory management system. The inventory management system may be configured to maintain information about items, users, condition of the facility, and so forth. For example, the inventory management system may maintain data indicative of a result of different events that occur within the facility, such as what items a particular user is ordered to pick, location of the particular user, availability of a user providing support services to others, requests for assistance, environmental status of the facility, and so forth. As such, as used herein a "result" of an event may comprise data representing some inference regarding the event, which may represent a particular value, indication that the event is inconclusive, or the like. That is, the result of an event may comprise any information deduced from automated or manual analysis of sensor data at least partly representative of the event.

Operation of the inventory management system may be supported by sensor data acquired by one or more sensors. The sensor data may include image data acquired by imaging devices such as cameras, information acquired from radio frequency tags, weight sensors, and so forth.

The inventory management system may determine, using the sensor data, occurrence of one or more events within the facility. Events may involve interactions between one or more items, inventory locations, users, totes, robots, changes in sensor operation, movement of objects, and so forth. For example, a user may remove an item from an inventory location. In another example, two or more users may move past one another or attempt to access the same inventory location contemporaneously. When the system described herein detects sensor data indicative of an event, the system may generate an event record that indicates the occurrence of the event.

The inventory management system may be configured to generate output data providing information indicative of the event using one or more machine learning or automated systems to process the sensor data. For example, artificial neural networks, classifiers, and so forth, may be used to process the image data of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify an item removed from an inventory location as well as a user that removed the item. In response, the inventory management system may automatically update a virtual shopping cart of that particular user. However, in some situations, it may be advantageous to use human input to generate or confirm the output data. In these situations, the sensor data may be provided to one or more devices associated with one or more associates supporting operation of the facility. These associates may analyze the sensor data (e.g., view video data of the facility) and may indicate a result of the event, such as a particular user picking a particular item from a shelf of the facility.

Regardless of whether the event is identified automatically or based on input from a human user, the sensor data may be used to identify the events. Further, after determining the result of the event, the sensor data associated with the event may be used to train a model or classifier that is used to identify later events. Therefore, while the sensor data may be useful (e.g., for training classifiers) after the occurrence of an event, the magnitude of the accumulated sensor data over time may be so large that retention of all sensor data for unlimited amounts of time may not be feasible. Therefore, the techniques described herein may intelligently determine which sensor data to store for a default amount of a time, and which sensor data to store for a greater (or lesser amount of time).

As described below, the techniques may store some or all acquired sensor data for at least a default amount of time, such as two hours, ten days, one month, or the like. However, the described system may identify a subset of this sensor data to store for a longer period of time, such as indefinitely or until any other time later than occurrence of the default amount of time.

In some instances, the system may allow human users responsible for identifying the events and/or operating the facility in any other manner the ability to issue requests to store certain portions of sensor data for a longer period of time than the default amount of time. For example, the system may provide access to a user interface (UI) that allows the users to specify time ranges and/or locations of interest within the facility. For example, a user may utilize a client computing to indicate, via the UI, that sensor data associated with a particular location of the facility for a particular time and date be stored for a longer amount of time than other sensor data acquired that day. In response to receiving that request, the system may refrain from deleting that sensor data at least until expiration of an amount of time that is greater than the default amount of time, such as until an expiration of the amount of time specified by the user via the UI.

In other instances, the system may analyze the sensor data for a particular amount of time, such as a single day, to determine a predefined amount of data to store for that amount of time. In one example, the system may identify two hours of each day to mark for longer-term storage. The system may make this identification based on any number of factors. In one example, the system determines an interestingness of sensor data and designates the most interesting sensor data as data to be stored for the longer term. For instance, the system may calculate an interestingness score for particular sensor and compare this score to an interestingness threshold. In one example, the system calculates a complexity score for portions of the sensor data based on a number of events represented by the sensor data as well as respective confidence scores of the events. For instance, if many events occur during a particular time of day, then complexity scores associated with that particular time of day may have higher complexity scores than sensor data associated with other times of day (e.g., times of day for which few or no events took place). Further, the complexity score may be based on respective confidence levels associated with results of the event. In these instances, portions of sensor data corresponding to events have relatively low-confidence values may have greater complexity scores than sensor data corresponding to events having relatively high-confidence values. As such, the portions of sensor data for the day (or other amount of time) having a greater number of events with relatively less confidence values may be determined to have higher complexity scores and, thus, may be saved for an amount of time that is greater than the default amount of time.

In these instances, the sensor data selected for longer-term storage may comprise the sensor data having complexity scores that is greater than a complexity threshold. In some instances, the complexity threshold may be calculated over the predefined period of time, such as the single day. As such, the two hours of sensor data having the greatest amount of complexity for a single day may be stored longer term. In other instances, meanwhile, the complexity threshold may be preset such that the amount of sensor data stored may vary day-to-day.

In some instances, sensor data may be identified for long-term storage based on tags associated with the data. For example, the system may use computer-vision (CV) algorithms to analyze the sensor data to identify different attributes of the sensor data, such as attributes of any users represented in the data, items represented in the data, actions represented in the data, or the like. For instance, the CV algorithms may be used to identify the presence of children in the sensor data, shopping carts, animals, certain items of high value or otherwise of interest, or the like. The system may then automatically apply these tags to the sensor data by storing respective indications of the tag with the sensor data. Further, certain tags may be associated with a policy indicating that sensor data associated with the respective tag is to be stored for a certain amount of time (e.g., longer than the default amount of time). Therefore, by applying tags automatically to the sensor data the techniques may identify sensor data that should be stored longer than the default amount of time. For example, if users operating the system desire to train additional models around the interaction of children within the facility, sensor data determined to be associated with the tag "child" may be designated for longer term storage. As used herein, a tag applied to sensor data may comprise a string of text indicating one or more attributes of the sensor data, such as "child", "pick", "return", "item exchange", or the like.

In other examples, users that operate the facility may manually associate tags with the sensor data. For example, the system may make the sensor data available for analysis on client computing devices of the users such that the users may apply tags to different portions of the sensor data. Continuing the example from above, the user may apply the tag "child" to a particular time range of the sensor data and, if this tag is associated with a policy for longer storage of sensor data associated with this tag, the system may store this sensor data for an amount of time longer than the default amount of time.

In still other instances, interestingness scores of sensor data may be calculated based on other factors, such as the occurrence of an error in the sensor data or in a result of an event determined using the sensor data. For example, as describe briefly above and in detail below, in some instances sensor data may be sent to a client computing device for analysis by a human user. In these instances, the sensor data sent to the client device may be designated for longer-term storage (or may result in a higher interestingness score, resulting in a greater likelihood for longer-term storage). In still other instances, sensor data depicting certain activities may be stored for greater than the default amount of time. This activity may include the presence of a child, a user running in the facility, a person laying down in the facility, the presence of a weapon or other potentially dangerous object, loud applause or other noise, or the like. In still other instances, events may be disputed by users. For example, envision that the system described herein determines that a user picked a candy bar from a shelf and the system thus charges the user for the candy bar. Should the user later dispute that she acquired the candy bar (or disputes that she did not put it back), then the system may automatically designate sensor data corresponding to this (potential) event for longer-term storage. In each of these instances, these attributes of the sensor data may result in storing the associated sensor data for a longer term, may result in a higher interestingness score, resulting in a greater likelihood for longer-term storage.

Storing portions of sensor data for varying amounts of time may be accomplished in different manners. In one instance, received sensor data is stored in a first location that periodically or continuously deletes the oldest sensor data stored at that location. For instance, some or all acquired sensor data may be stored in a first storage location for a default amount of time, such as ten hours, ten days, ten weeks, or the like. Further, when a portion of sensor data is marked to be stored for a longer (or lesser) amount of time, the system may copy the contents of the sensor data from the first storage location to a second storage location. The system may then maintain this copy of the sensor data at the second location for an indefinite amount of time or for an amount of time specified (e.g., specified at the time of storage or thereafter). In some instances, the sensor data will be deleted from the second storage location at a time based on an expiration date of the sensor data in the second storage location.

As used herein a first storage location may comprise one or more databases and/or a portion of one or databases. As such, the first location may store an array of different types and time ranges of sensor data (e.g., data from cameras, microphones, etc.). In some instances, all or substantially all incoming sensor data from the sensors is stored for the default amount of time in the first storage location. The second storage location, meanwhile, may comprise a different of the same and/or different one or more databases. The second storage location may thus store multiple portions of sensor data, namely all or substantially all sensor data that has been designated for longer-term storage. Thus, it is to be appreciated that different sensor data may be stored in different portions of the first location. Similarly, different sensor data may be stored in different portions of the second location.

In some instances, the sensor data may be identified with reference to a time range and location. For instance, a user may operate a client device to send a request to store, for an amount of time that is greater than the default amount of time, certain sensor data at a at a particular location within a facility and during a certain time range. The system may then identify the sensors at that location, as well as the data acquired by these sensors at that time, and may store an indication that this data is to be stored for a greater amount of time than the default amount of time.

The facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations. More specifically, the techniques for determining subset(s) of sensor data for longer-term storage may be applied in any other environment in which sensor data is acquired, such as in a security-camera environment or the like.

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) (generally denoted as 104) may be held. As used in this disclosure, letters in parenthesis such as "(Q)" indicate an integer result. The items 104 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 106, a storage area 108, and a transition area 110. The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) (generally denoted as 116), totes 118(1), 118(2), . . . , 118(T) (generally denoted as 118) or other material handling apparatus may move within the facility 102. For example, the users 116 may move about within the facility 102 to pick or place the items 104 in various inventory locations 114, placing them on the totes 118 for ease of transport. An individual tote 118 is configured to carry or otherwise transport one or more items 104. For example, a tote 118 may include a basket, a cart, a bag, and so forth. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, cameras 120(1), weight sensors, radio frequency (RF) receivers, temperature sensors, humidity sensors, vibration sensors, and so forth. The sensors 120 may be stationary or mobile, relative to the facility 102. For example, the inventory locations 114 may contain cameras 120(1) configured to acquire images of pick or placement of items 104 on shelves, of the users 116(1) and 116(2) in the facility 102, and so forth. In another example, the floor of the facility 102 may include weight sensors configured to determine a weight of the users 116 or other object thereupon. The sensors 120 are discussed in more detail below with regard to FIG. 2.

During operation of the facility 102, the sensors 120 may be configured to provide information suitable for tracking how objects move or other occurrences within the facility 102. For example, a series of images acquired by an camera 120(1) may indicate removal of an item 104 from a particular inventory location 114 by one of the users 116 and placement of the item 104 on or at least partially within one of the tote 118s.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, multiple different receiving areas 106, storage areas 108, and transition areas 110 may be interspersed rather than segregated in the facility 102.

The facility 102 may include, or be coupled to, an inventory management system 122. The inventory management system 122 is configured to identify, using the sensor data, interactions with and between users 116, devices such as sensors 120, robots, material handling equipment, computing devices, and so forth, in one or more of the receiving area 106, the storage area 108, or the transition area 110. These interactions may include one or more events 124. For example, events 124 may include the entry of the user 116 to the facility 102, stocking of items 104 at an inventory location 114, picking of an item 104 from an inventory location 114, returning of an item 104 to an inventory location 114, placement of an item 104 within a tote 118, movement of users 116 relative to one another, gestures by the users 116, and so forth. Other events 124 involving users 116 may include the user 116 providing authentication information in the facility 102, using a computing device at the facility 102 to authenticate identity to the inventory management system 122, and so forth. Some events 124 may involve one or more other objects within the facility 102. For example, the event 124 may comprise movement within the facility 102 of an inventory location 114, such as a counter mounted on wheels. Events 124 may involve one or more of the sensors 120. For example, a change in operation of a sensor 120, such as a sensor failure, change in alignment, and so forth, may be designated as an event 124. Continuing the example, movement of an camera 120(1) resulting in a change in the orientation of the field of view 128 (such as resulting from someone or something bumping the camera 120(1)) may be designated as an event 124.

By determining the occurrence of one or more of the events 124, the inventory management system 122 may generate output data. The output data comprises information about the event 124. For example, where the event 124 comprises an item 104 being removed from an inventory location 114, the output data may comprise an item identifier indicative of the particular item 104 that was removed from the inventory location 114 and a user identifier of a user that removed the item.

The inventory management system 122 may use one or more automated systems to generate the output data. For example, an artificial neural network, one or more classifiers, or other automated machine learning techniques may be used to process the sensor data from the one or more sensors 120 to generate output data. The automated systems may operate using probabilistic or non-probabilistic techniques. For example, the automated systems may use a Bayesian network. In another example, the automated systems may use support vector machines to generate the output data or the tentative results. The automated systems may generate confidence level data that provides information indicative of the accuracy or confidence that the output data or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 104, user 116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 116 may pick an item 104(1) such as a perfume bottle that is generally cubical in shape from the inventory location 114. Other items 104 at nearby inventory locations 114 may be predominately spherical. Based on the difference in shape (cube vs. sphere) from the adjacent items, and the correspondence in shape with the previously stored image of the perfume bottle item 104(1) (cubical and cubical), the confidence level that the user 114 has picked up the perfume bottle item 104(1) is high.

In some situations, the automated techniques may be unable to generate output data with a confidence level above a threshold confidence level. For example, the automated techniques may be unable to distinguish which user 116 in a crowd of users 116 has picked up the item 104 from the inventory location 114. In these and other situations, it may be desirable to provide human confirmation of the event 124 or of the accuracy of the output data. For example, some items 104 may be deemed age restricted such that they are to be handled only by users 116 above a minimum age threshold.

In instances where human confirmation is desired, sensor data associated with an event 124 may be processed to generate inquiry data. The inquiry data may include a subset of the sensor data associated with the event 124. The inquiry data may also include one or more of one or more tentative results as determined by the automated techniques, or supplemental data. The subset of the sensor data may be determined using information about the one or more sensors 120. For example, camera data such as the location of the camera 120(1) within the facility 102, the orientation of the camera 120(1), and a field of view of the camera 120(1) may be used to determine if a particular location within the facility 102 is within the purview of the camera 120(1). The subset of the sensor data may include images that may show the inventory location 114 or that the item 104 was stowed.

Continuing the example, the subset of the sensor data may comprise a video clip acquired by one or more cameras 120(1) having a field of view that includes the item 104. The tentative results may comprise the "best guess" as to which items 104 may have been involved in the event 124. For example, the tentative results may comprise results determined by the automated system that have a confidence level above a minimum threshold. This inquiry data may be sent to one or more client computing devices associated with one or more human users, who may view or otherwise analyze the sensor data to determine the result of the event, such as which user picked which item. The system may then receive information indicative of this determination from the client computing devices.

FIG. 1 also illustrates that the facility 102 includes or has access to a data-retention system 126. The data-retention system 126 may function to determine how long to store different portions of the acquired sensor data. For instance, the data-retention system 126 may store some or all acquired data for a default amount of time, while marking a subset of the sensor data as to be stored for a greater (or lesser) amount of time. For instance, the data-retention system 126 may determine a portion of sensor data for each day or other regular time period that is deemed most complex or interesting and may store this sensor data for a greater amount of time than the default amount of time. In some instances, complexity may be determine based on activity represented by the sensor data. For instance, the sensor data may be analyzed to identify certain types of activity, such as a child running through the store, a user drawing a weapon, or any other type of activity of interest. The complexity score may be based on the identifying of these activities or events. In other instances, the complexity score for sensor data is based on the presence of the events coupled with the respective confidence levels associated with the events.

In another example, the system may apply tags to the sensor data, automatically or in response to user input. Some of these tags may be associated with respective policies that indicate the amount of time that sensor data associated with this tag is to be stored for. In another example, the system may receive requests from client computing devices based on input from human users requesting to store sensor data associated with a certain time of day and/or location within the facility. In each of these examples, the data-retention system 126 may store the sensor data for an amount of time that differs from the default amount of time.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102. The receiving of the items 104 may comprise one or more events 124 for which the inventory management system 122 may generate output data.

Upon being received from a supplier at receiving area 106, the items 104 may be prepared for storage. For example, items 104 may be unpacked or otherwise rearranged. The inventory management system 122 may include one or more software applications executing on a computer system to provide inventory management functions based on the events 124 associated with the unpacking or rearrangement. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114. Storage of the items 104 and their respective inventory locations 114 may comprise one or more events 124.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102. Picking may comprise one or more events 124, such as the user 116 in moving to the inventory location 114, retrieval of the item 104 from the inventory location 114, and so forth.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. The transitioning may comprise one or more events 124. Information about the transition may be maintained by the inventory management system 122 using the output data associated with those events 124.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102. The purchase or rental may comprise one or more events 124.

During use of the facility 102, the user 116 may move about the facility 102 to perform various tasks, such as picking or placing the items 104 in the inventory locations 114. Pluralities of users 116 may move past one another, travel in groups, may coalesce into groups, groups may break apart, and so forth. These movements may comprise one or more events 124. For example, an event 124 may comprise a plurality of users 116 moving past one another in the aisle 112.

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include cameras 120(1) configured to acquire image data of scenes in the facility 102. The image data may comprise still images, video, or a combination thereof. The image data may be processed by the inventory management system 122 to determine a location of the user 116, the tote 118, the identity of the user 116, and so forth. The sensors 120 are discussed in more detail below with regard to FIG. 2.

The inventory management system 122, or systems coupled thereto, may be configured to identify the user 116, as well as to determine other candidate users. In one implementation, this determination may comprise comparing sensor data with previously stored identity data. For example, the user 116 may be identified by showing their face to a facial recognition system, by presenting a token carrying authentication credentials, providing a fingerprint, scanning a barcode or other type of unique identifier upon entering the facility, and so forth. Identity of the user 116 may be determined before, during, or after entry to the facility 102. Determination of the user's 116 identity may comprise comparing sensor data associated with the user 116 in the facility 102 to previously stored user data.

In some instances, the inventory management system group users within the facility into respective sessions. That is, the inventory management system 122 may utilize the sensor data to determine groups of users that are effectively "together" (e.g., shopping together). In some instances, a particular session may include multiple users that entered the facility 102 together and, potentially, that navigate the facility together. For example, when a family of two adults and two children enter the facility together, the inventory management system may associate each user with a particular session. Tracking sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 118. Noting the child and the mother as belonging to the same session may increase the chances of successfully adding the box of cereal to the virtual shopping cart of the mother.

By determining the occurrence of one or more events 124 and the output data associated therewith, the inventory management system 122 is able to provide one or more services to the users 116 of the facility 102. By utilizing one or more human associates to process inquiry data and generate response data that may then be used to produce output data, overall accuracy of the system may be enhanced. The enhanced accuracy may improve the user experience of the one or more users 116 of the facility 102.

Figure 2:
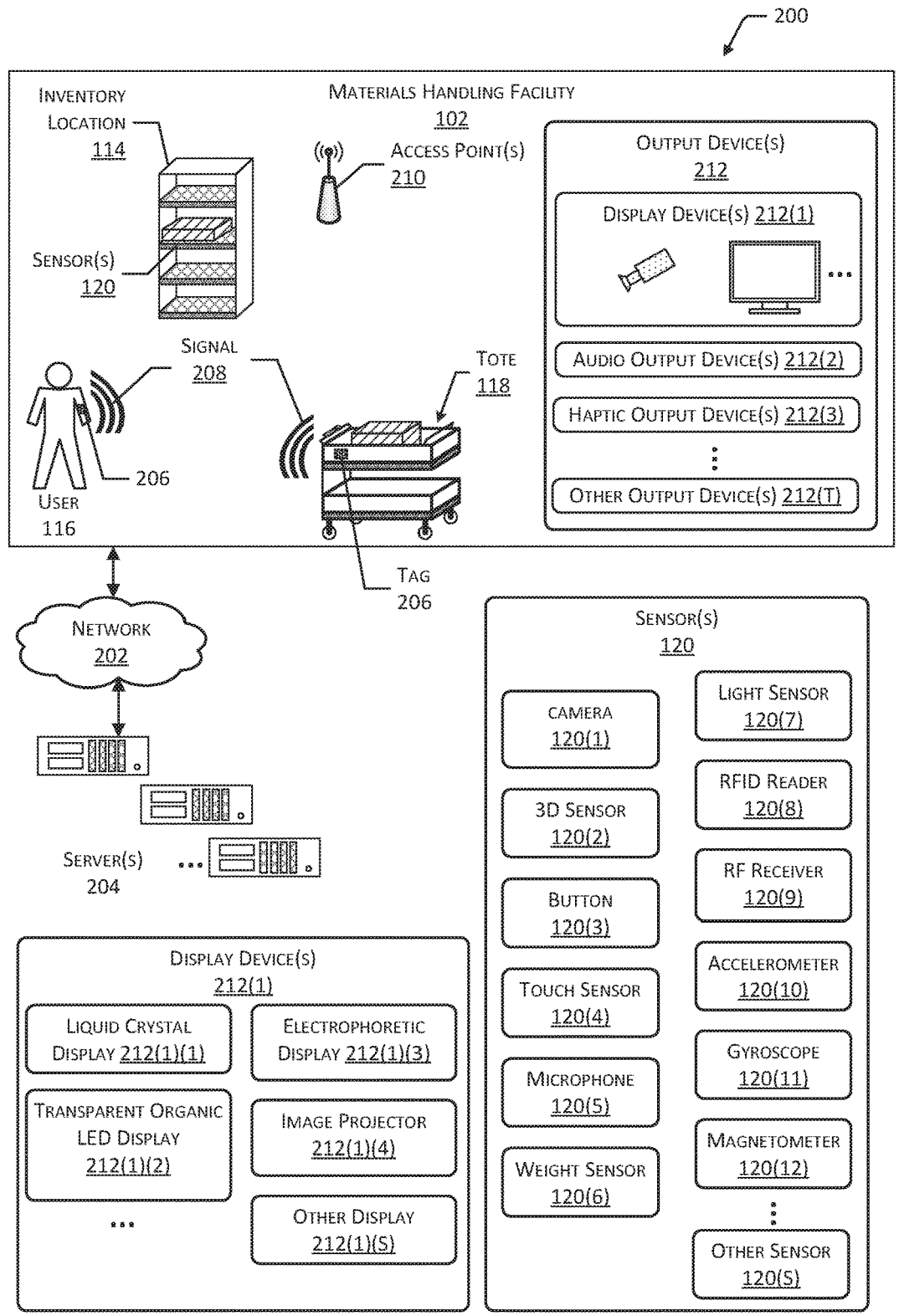
FIG. 2 is a block diagram illustrating additional details of the facility, including example sensors that generate the sensor data for determining events that occur within the facility.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more physical tags 206, such as radio frequency (RF) tags. The physical tags 206 may be configured to emit a signal 208. In one implementation, the physical tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the physical tag 206 may comprise a transmitter and a power source configured to power the transmitter. For example, the physical tag 206 may comprise a Bluetooth Low Energy (BLE) transmitter and battery. In other implementations, the physical tag 206 may use other techniques to indicate presence. For example, an acoustic tag 206 may be configured to generate an ultrasonic signal which is detected by corresponding acoustic receivers. In yet another implementation, the physical tag 206 may be configured to emit an optical signal.

The inventory management system 122 may be configured to use the physical tags 206 for one or more of identification of the object, determining a location of the object, and so forth. For example, the users 116 may wear physical tags 206, the totes 118 may have tags 206 affixed, and so forth, which may be read and, based at least in part on signal strength, used to determine identity and location. Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, may be carried or worn by the user 116, and so forth. The sensors 120 produce respective sensor data.

The sensors 120 may include one or more cameras 120(1). These cameras 120(1) may include cameras configured to acquire images of a scene. The cameras 120(1) are configured to detect light in one or more wavelengths including, but not limited to, terahertz, infrared, visible, ultraviolet, and so forth. The inventory management system 122 may use image data acquired by the cameras 120(1) during operation of the facility 102. For example, the inventory management system 122 may identify items 104, identify users 116, identify totes 118, determine a location, and so forth, based at least in part on their appearance within the image data.

One or more three-dimensional (3D) sensors 120(2) may also be included in the sensors 120. The 3D sensors 120(2) are configured to acquire spatial or 3D data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the 3D data acquired to identify objects, determine a location of an object, and so forth. For example, the inventory management system 122 may determine operational data such as location in the facility 102 of the user 116 based at least in part on the location in 3D space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116 and produce button data.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment and generate audio data. In some implementations, arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth and generate weight data. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7) configured to generate light sensor data. The light sensors 120(7) may be configured to provide information associated with ambient lighting conditions such as a level of illumination. Information acquired by the light sensors 120(7) may be used by the inventory management system 122 to adjust a level, intensity, or configuration of the user interface.

One more radio frequency identification (RFID) readers 120(8), near field communication (NFC) systems, and so forth, may also be provided in the sensors 120. For example, the RFID readers 120(8) may be configured to read the tags 206 and generate RFID tag data. Information acquired by the RFID reader 120(8) may be used by the inventory management system 122 to identify an object associated with the tag 206 such as the item 104, the user 116, the tote 118, and so forth. For example, based on information from the RFID readers 120(8), a velocity of the tag 206 may be determined.

One or more RF receivers 120(9) may also be provided in the sensors 120 to generate radio-frequency data. In some implementations, the RF receivers 120(9) may be part of transceiver assemblies. The RF receivers 120(9) may be configured to acquire RF signals 208 associated with Wi-Fi™, Bluetooth®, ZigBee®, Z-Wave, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10) that may be worn or carried by the user 116, mounted to the tote 118, and so forth. The accelerometers 120(10) may provide accelerometer data such as the direction and magnitude of an imposed acceleration. Data such as rate of acceleration, determination of changes in direction, speed, and so forth, may be determined using the accelerometers 120(10).

A gyroscope 120(11) provides gyroscope data indicative of rotation of an object affixed thereto. For example, the tote 118, the user 116, or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may generate magnetometer data indicative of the direction, strength, and so forth of a magnetic field. The magnetometer 120(12) may be worn or carried by the user 116, mounted to the tote 118, and so forth. For example, the magnetometer 120(12) mounted to the tote 118 may act as a compass and provide information indicative of which way the tote 118 is oriented.

The sensors 120 may include other sensors 120(S) as well. For example, the other sensors 120(S) may include proximity sensors, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114.

The facility 102 may include one or more access points 210 configured to establish one or more wireless networks and the network 202. The access points 210 may use Wi-Fi™, NFC, Bluetooth®, or other technologies to establish wireless communications between a device and the network 202. The wireless networks allow the devices to communicate with one or more of the inventory management system 122, the sensors 120, the tag 206, a communication device of the tote 118, or other devices.

Output devices 212 may also be provided in the facility 102. The output devices 212 are configured to generate signals which may be perceived by the user 116. The output devices 212 may include display devices 212(1), audio output devices 212(2), haptic output devices 212(3), or other output devices 212(T).

The display devices 212(1) may be configured to provide output which may be seen by the user 116 or detected by a light-sensitive detector such as an camera 120(1) or light sensor 120(7). The output may be monochrome or color. The display devices 212(1) may be emissive, reflective, or both. An emissive display device 212(1) is configured to emit light during operation. For example, a light emitting diode (LED) is an emissive visual display device 212(1). In comparison, a reflective display device 212(1) relies on ambient light to present an image. For example, an electrophoretic display 212(1)(3) is a reflective display device 212(1). Backlights or front lights may be used to illuminate the reflective visual display device 212(1) to provide visibility of the information in conditions where the ambient light levels are low.

Mechanisms of the display devices 212(1) may include liquid crystal displays 212(1)(1), transparent organic LED displays 212(1)(2), electrophoretic displays 212(1)(3), image projectors 212(1)(4), or other displays 212(1)(S). The other displays 212(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(1) may be configured to present images. For example, the display devices 212(1) may comprise a pixel-addressable display. The image may comprise at least a two-dimensional array of pixels or a vector representation of an at least two-dimensional image.

In some implementations, the display devices 212(1) may be configured to provide non-image data, such as text characters, colors, and so forth. For example, a segmented electrophoretic display 212(1)(3), segmented LED, and so forth, may be used to present information such as a stock keeping unit (SKU) number. The display devices 212(1) may also be configurable to vary the color of the text, such as using multicolor LED segments.

In some implementations, display devices 212(1) may be configurable to provide image or non-image output. For example, an electrophoretic display 212(1)(3) with addressable pixels may be used to present images of text information, or all of the pixels may be set to a solid color to provide a colored panel.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 212(3) are configured to provide a signal which results in a tactile sensation to the user 116. The haptic output devices 212(3) may use one or more mechanisms such as electrical stimulation or mechanical displacement to provide the signal. For example, the haptic output devices 212(3) may be configured to generate a modulated electrical signal, which produces an apparent tactile sensation in one or more fingers of the user 116. In another example, the haptic output devices 212(3) may comprise piezoelectric or rotary motor devices configured to provide a vibration, which may be felt by the user 116.

The facility 102 may include an interface device that comprises the sensors 120, the output devices 212, or both. For example, the tote 118 may include an interface device such as a display device 212(1) and a touch sensor 120(4). In some implementations, the interface device may include hardware processors, memory, and other elements configured to present a user interface, process input to the user interface, and so forth. Users 116, associates, or both users 116 and associates may use the interface device.

Other output devices 212(T) may also be present. For example, the other output devices 212(T) may include scent/odor dispensers, document printers, 3D printers or fabrication equipment, and so forth.

The inventory management system 122 may generate user interface data, which is then used by the interface device to present the user interface. The user interface may be configured to stimulate one or more senses of the user 116 or associate. For example, the user interface may comprise visual, audible, and haptic output.

Figure 3:
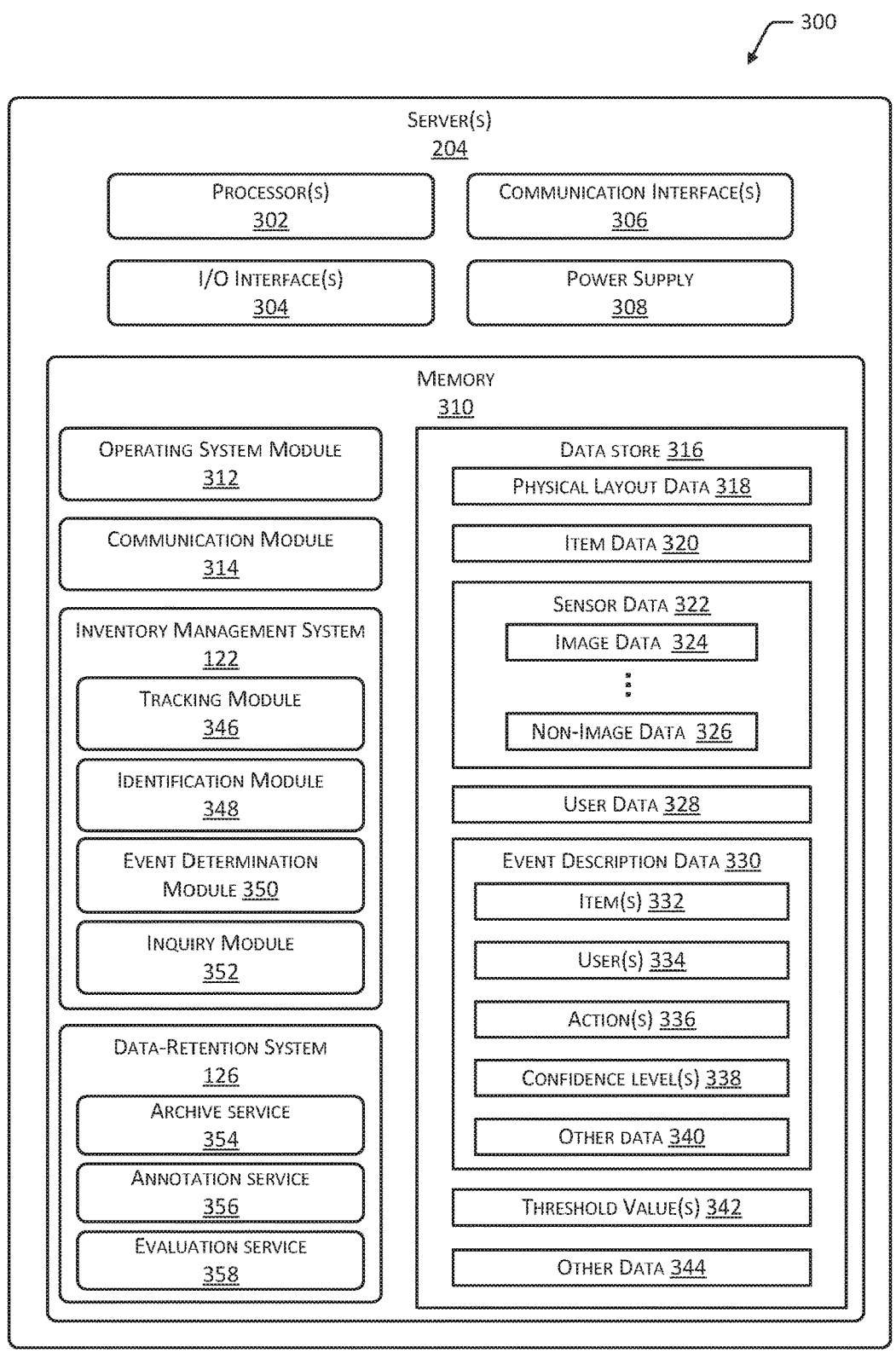
FIG. 3 illustrates a block diagram of one or more servers configured to support operation of the facility. As illustrated, the servers may host the data-retention system configured to determine which sensor data to store for the default amount of time and which sensor data to store for longer periods of time.

FIG. 3 illustrates a block diagram 300 of the one or more servers 204. As illustrated, the servers may host the data-retention system 126 configured to determine which sensor data to store for the default amount of time and which sensor data to store for longer periods of time. The servers 204 may be physically present at the facility 102, may be accessible by the network 202, or a combination of both. The servers 204 does not require end-user knowledge of the physical location and configuration of the system that delivers the services. Common expressions associated with the servers 204 may include "on-demand computing," "software as a service (SaaS)," "platform computing," "network-accessible platform," "cloud services," "data centers," and so forth. Services provided by the servers 204 may be distributed across one or more physical or virtual devices.

The servers 204 may include one or more hardware processors 302 (processors) configured to execute one or more stored instructions. The processors 302 may comprise one or more cores. The servers 204 may include one or more input/output (I/O) interface(s) 304 to allow the processor 302 or other portions of the servers 204 to communicate with other devices. The I/O interfaces 304 may comprise Inter-Integrated Circuit (I2C), Serial Peripheral Interface bus (SPI), Universal Serial Bus (USB) as promulgated by the USB Implementers Forum, RS-232, and so forth.

The servers 204 may also include one or more communication interfaces 306. The communication interfaces 306 are configured to provide communications between the servers 204 and other devices, such as the sensors 120, the interface devices, routers, the access points 210, and so forth. The communication interfaces 306 may include devices configured to couple to personal area networks (PANs), wired and wireless local area networks (LANs), wired and wireless wide area networks (WANs), and so forth. For example, the communication interfaces 306 may include devices compatible with Ethernet, Wi-Fi™, and so forth. The servers 204 may also include one or more busses or other internal communications hardware or software that allow for the transfer of data between the various modules and components of the servers 204.

The servers 204 may also include a power supply 308. The power supply 308 is configured to provide electrical power suitable for operating the components in the servers 204.

As shown in FIG. 3, the servers 204 includes one or more memories 310. The memory 310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the servers 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the communication interfaces 306, and provide various services to applications or modules executing on the processors 302. The OS module 312 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following modules may also be stored in the memory 310. These modules may be executed as foreground applications, background tasks, daemons, and so forth.

A communication module 314 may be configured to establish communications with one or more of the sensors 120, one or more of the devices used by associates, other servers 204, or other devices. The communications may be authenticated, encrypted, and so forth.

The memory 310 may also store the inventory management system 122. The inventory management system 122 may, for example, track movement of items 104 in the facility 102, generate user interface data, and so forth. The inventory management system 122 may access information stored in one or more data stores 316 in the memory 310. The data store 316 may use a flat file, database, linked list, tree, executable code, script, or other data structure to store the information. In some implementations, the data store 316 or a portion of the data store 316 may be distributed across one or more other devices including other servers 204, network attached storage devices, and so forth.

The data store 316 may include physical layout data 318. The physical layout data 318 provides a mapping of physical locations within the physical layout of devices and objects such as the sensors 120, inventory locations 114, and so forth. The physical layout data 318 may indicate the coordinates within the facility 102 of an inventory location 114, sensors 120 within view of that inventory location 114, and so forth. For example, the physical layout data 318 may include camera data comprising one or more of a location within the facility 102 of an camera 120(1), orientation of the camera 120(1), the operational status, and so forth. Continuing example, the physical layout data 318 may indicate the coordinates of the camera 120(1), pan and tilt information indicative of a direction that the field of view of the camera 120(1) is oriented along, whether the camera 120(1) is operating or malfunctioning, and so forth.

In some implementations, the inventory management system 122 may access the physical layout data 318 to determine if a location associated with the event 124 is within the field of view of one or more sensors 120. Continuing the example above, given the location within the facility 102 of the event 124 and the camera data, the inventory management system 122 may determine the cameras 120(1) that may have generated images of the event 124.

The item data 320 comprises information associated with the items 104. The information may include information indicative of one or more inventory locations 114 at which one or more of the items 104 are stored. The item data 320 may also include order data, SKU or other product identifier, price, quantity on hand, weight, expiration date, images of the item 104, detail description information, ratings, ranking, and so forth. The inventory management system 122 may store information associated with inventory management functions in the item data 320.

The data store 316 may also include sensor data 322. The sensor data 322 comprises information acquired from, or based on, the one or more sensors 120. For example, the sensor data 322 may comprise 3D information about an object in the facility 102. As described above, the sensors 120 may include an camera 120(1), which is configured to acquire one or more images. These images may be stored as the image data 324 (e.g., video data, still-image data, etc.), which may comprise information descriptive of a plurality of picture elements or pixels. Non-image data 324 may comprise information from other sensors 120, such as input from the microphones 120(5), weight sensors 120(6), and so forth. Further, as described above and in further detail below, the data store 316 may store different portions of this sensor data 322 for varying amounts of time. As described herein, the sensor data 322 may be associated with different times and/or time ranges. In some instances, the sensor data 322 provided by the sensors provide this time information (e.g., as metadata associated with the sensor data), while in other instance the time information may be appended to the sensor data 322 or otherwise associated with the sensor data upon storage in the data store.

User data 328 may also be stored in the data store 316. The user data 328 may include identity data, information indicative of a profile, purchase history, location data, images of the user 116, demographic data, and so forth. Individual users 116 or groups of users 116 may selectively provide user data 328 for use by the inventory management system 122. The individual users 116 or groups of users 116 may also authorize collection of the user data 328 during use of the facility 102 or access to user data 328 obtained from other systems. For example, the user 116 may opt-in to collection of the user data 328 to receive enhanced services while using the facility 102.

In some implementations, the user data 328 may include information designating a user 116 for special handling. For example, the user data 328 may indicate that a particular user 116 has been associated with an increased number of errors with respect to output data. The inventory management system 122 may be configured to use this information to apply additional scrutiny to the events 124 associated with this user 116. For example, events 124 that include an item 104 having a cost or result above the threshold amount may be provided to the associates for processing regardless of the determined level of confidence in the output data as generated by the automated system.

The inventory management system 122 may include one or more of a tracking module 346, identification module 348, event determination module 350, and inquiry module 352. The tracking module 346 may be configured to track one or more objects associated with the facility 102. For example, the tracking module 346 may access the sensor data 322 to determine location data.

The location data provides information indicative of a location of an object, such as the item 104, the user 116, the tote 118, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 114 along a heading of 169°, and so forth. For example, the location data may indicate that the user 116(1) is 25.2 m along the aisle 112(1) and standing in front of the inventory location 114(47). In comparison, a relative location may indicate that the user 116(1) is 32 cm from the tote 118 at a heading of 73° with respect to the tote 118. The location data may include orientation information, such as which direction the user 116 is facing. The orientation may be determined by the relative direction the user's 116 body is facing. In some implementations, the orientation may be relative to the interface device. Continuing the example, the location data may indicate that the user 116(1) is oriented with a heading of 0°, or looking north. In another example, the location data may indicate that the user 116 is facing towards the interface device.

The identification module 348 is configured to identify an object. In one implementation, the identification module 348 may be configured to identify an item 104. In another implementation, the identification module 348 may be configured to identify the user 116. For example, the identification module 348 may use facial recognition techniques to process the image data 324 and determine the identity data of the user 116 depicted in the images by comparing the characteristics in the image data 324 with previously stored results. The identification module 348 may also access data from other sensors 120, such as from the RFID reader 120(8), the RF receiver 120(9), fingerprint sensors, and so forth.

Facial recognition may include analyzing facial characteristics which are indicative of one or more facial features in an image, 3D data, or both. For example, the face of the user 116 may be detected within one or more of the images of the image data 324. The facial features include measurements of, or comparisons between, facial fiducials or ordinal points. The facial features may include eyes, mouth, lips, nose, chin, ears, face width, skin texture, 3D shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

In one implementation, the facial recognition described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the user data 328 of the person in the image or to distinguish one user 116 from another.

The event determination module 350 is configured to process the sensor data 322 and generate the event description data 330. The event description data 330 comprises information indicative of one or more events 124. For example, the event description data 330 may indicate any items 332 that were associated with a respective event, any users 334 that were associated with the respective event, any actions 334 associated with the respective event, a confidence level 338 associated with the respective event, and potentially other data 340. For example, the event description data 330 may indicate, for a particular event, that a particular user picked a particular item from a shelf within the facility. The confidence level 338 of the event may indicate the accuracy of this conclusion and/or accuracy of other portions of the corresponding event description data.

In some implementations, when the confidence level 338 associated with a result of a particular event exceeds a threshold confidence value 342, the event determination module 350 may deem the result sufficiently accurate and thus may be deemed a conclusive result of the event. For example, the event determination module 350 may provide tentative results indicative of the three possible items 104(1), 104(2), and 104(3) corresponding to the "pick" event 124 of FIG. 1. The confidence levels 338 associated with the possible items 104(1), 104(2), and 104(3) may be 25%, 70%, 92%, respectively. Continuing the example, the threshold result may be set such that confidence level 338 of 90% is deemed to be sufficiently accurate. As a result, the event determination module 350 may designate the "pick" event 124 as involving item 104(3).

In situations where the event determination module 350 determines that the confidence level 338 associated with the tentative result is below a threshold confidence value 342, the inquiry module 352 may seek input from a human user to determine a result of the event. To do so, the inquiry module 352 may be configured to use at least a portion of the sensor data 322 associated with the event 124 to generate inquiry data to send a client computing device of one or more associates (i.e., human users). In some implementations, the inquiry data may include indications of one or more of the tentative results along with sensor data associated with the time and location of the event in the facility. An associate user interface is presented on the respective devices of associates. The associate may generate response data by selecting a particular tentative result, entering new information, indicating that they are unable to answer the inquiry, and so forth.

By using the inquiry module 352, the event determination module 350 may be able to provide high reliability results that accurately represents events within the facility. Further, the results of these events determined via the inquiry module 352 may be may also be used to further train the automated systems used by the inventory management system 122, as discussed below with reference to an evaluation service 358. For example, the sensor data 322 and an indication of the result of the event may be provided to one or more of the modules of the inventory management system 122 for training in process improvement. Continuing the example, this information may be provided to an artificial neural network, Bayesian network, and so forth, to further train these systems such that the confidence level 338 and the tentative results produced in the future for the same or similar input is improved.

FIG. 3 further illustrates that the servers 204 may store or have access to the components of the data-retention system 126, including an archive service 354, an annotation service 356, and the evaluation service 358. The archive service 354 functions to receive requests to archive portions of the sensor data 322 for varying periods of time. For instance, the archive service 354 may receive requests to store some or all of the sensor data 322 for a default amount of time, while receiving additional requests to store different subsets of this sensor data 322 for an even longer amount of time. As described in further detail below with reference to FIG. 4, the archive service 354 may receive these requests based on input from human users, based on automatic analysis of the complexity or importance of the different portions of sensor data, based on certain tags being automatically or manually applied to the sensor data, or the like.

The annotation service 356 functions to associate different tags to different portions of the sensor data. In some instances, the annotation service 356 executes CV algorithms to identify certain attributes of the sensor data, such as attributes of users depicted within video data, attributes of items or actions represented by the sensor data, or the like. The annotation service 356 may then store an indication that particular sensor data is associated with one or more particular tags. Further, in other instances the annotation service 356 provides data for generating UIs on client computing devices of human users to allow the users to request to manually associate tags with certain portions of the sensor data. For instance, a user may request and view a particular portion of video data and, upon viewing the video data, may request to associate a particular tag with that portion of sensor data. Again, the annotation service 356 may then store an indication that the this portion of sensor data is associated with that particular tag. Further, in instances where the tag is associated with a policy indicating that data associated with that tag is to be stored for an amount of time that is greater than the default amount of time, the archive service 354 may identify this tag and store may ensure that the corresponding sensor data is stored for the greater amount of time.

The evaluation service 356, meanwhile, may use the sensor data to train one or more models for use in more accurately identifying events within the facility 102. For instance, the evaluation service 358 may use the archived data 358 to train models associated with certain circumstances that may occur within the facility, such as the presence of children within the facility, two or more users in close proximity with one another during a pick of an item, the exchange of an item between two users within the facility 102, and the like.

The memory 310 may also store one or more additional modules. For example, an accounting module may be configured to generate information indicative of a cost of goods picked by the user 116. Other data 344 may also be stored in the data store 316. For example, the other data 344 may comprise the cost of goods picked by the user 116, payment information, and so forth.

Figure 4:
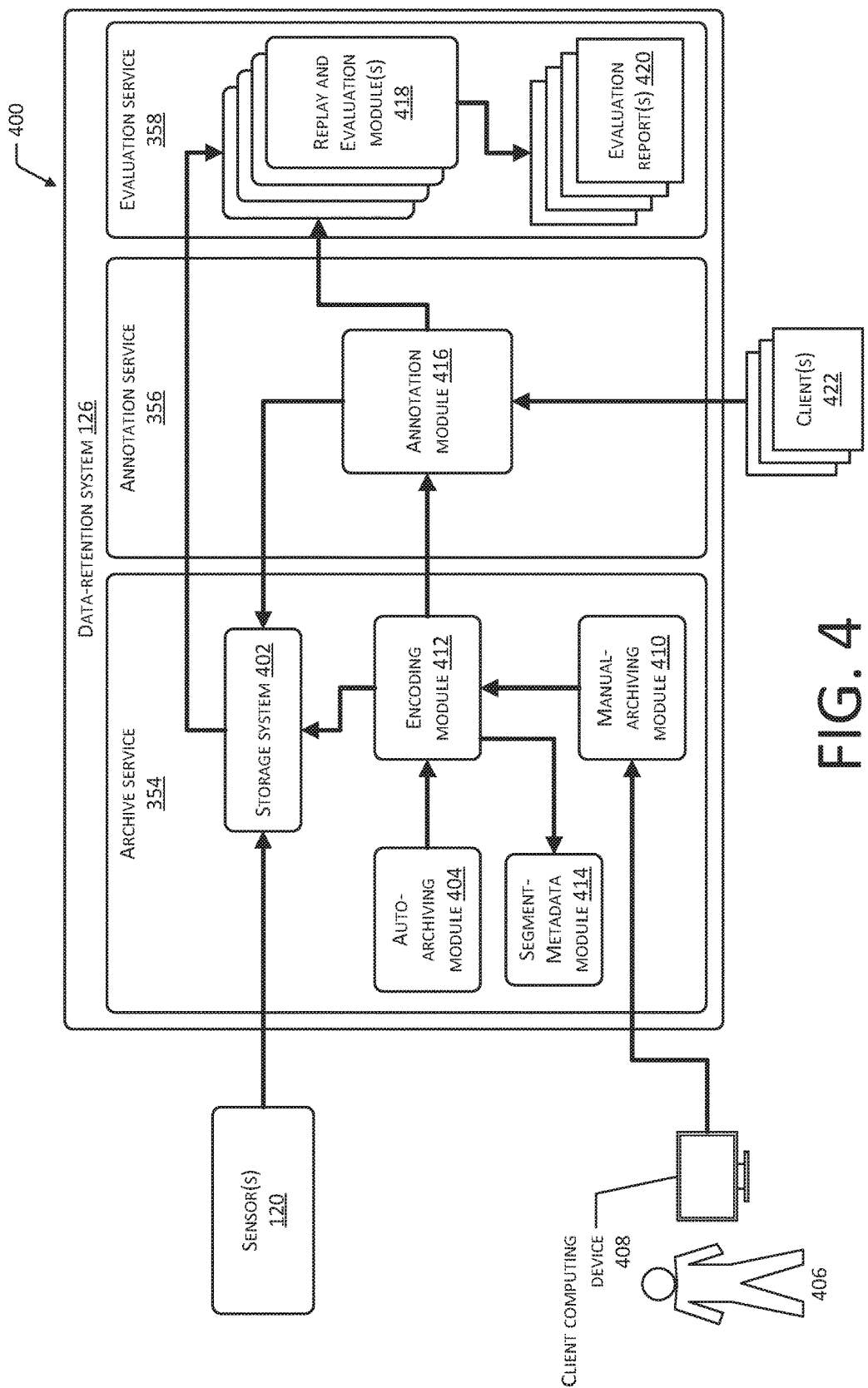
FIG. 4 is a block diagram of example components of the data-retention system in greater detail.

FIG. 4 is a block diagram of example components 400 of the data-retention system 126 in greater detail. As illustrated, one or more of the sensors 120 described above may send sensor data to a storage system 404 of the archive service 354 after acquiring the sensor data. For instance, when an RGB camera, a depth camera, or the like acquires video data, the respective camera may provide (e.g., stream, upload, etc.) the video data to the storage system 404. In some instances, the storage system 404 stores this sensor data for a default amount of time, such as one hour, ten days, one year, or the like. To do so, the storage system 404 may store the sensor data in a data store having a lifecycle policy that deletes sensor data after a threshold amount of time after receiving the sensor data or after a capture date/time associated with the data. For example, such a database may, at the end of each day or throughout a day, delete the sensor data that is more than ten days old.

In some instances, however, the data-retention system 126 may determine to store a subset of the received sensor data for an amount of time that is greater (or lesser) than the default amount of time. In this regard, FIG. 4 illustrates an auto-archiving module 404 that functions to automatically (e.g., algorithmically) identify certain sensor data for longer-term storage and may issues a request that this data be stored for an amount of time that is greater than the default amount of time.

In one example, the auto-archiving module 404 calculates a complexity score for different portions of sensor data for a particular amount of time to determine which sensor data to store for the longer period of time. For example, the auto-archiving module may calculate a respective complexity score for each segment of sensor data based on a number of events that have been determined to occur during a time corresponding to the respective segment of data as well as a corresponding confidence level associated with those event(s). For instance, a complexity value may be greater for segments of data corresponding to times that have a greater number of events and/or events associated with lower confidence levels. Further, in instances where events and sensors are associated with particular locations (e.g., within the facility 102), the auto-archiving module 404 may take location into account when calculating these complexity scores. For example, the auto-archiving module 404 may calculate, for an example video segment received from an example camera, a complexity score for that segment based on events that occur in the facility at the time corresponding to the segment and at the location (e.g., within the purview of) the camera, as well as based on the confidence level associated with the event.

In some instances, the auto-archiving module 404 requests to store, for a time greater than the default amount of time, a certain amount of sensor data each day. For example, the auto-archiving module 404 may request to store two hours (or any other amount) of video data for each day determined to have the highest complexity scores for that day. In these instances, the complexity threshold, over which video is marked for longer-storage, is determined by the module 404 on a daily or other periodic basis. In another example, however, the auto-archiving module 404 may utilize a fixed threshold across days or other periods, such that the amount of data stored for the longer-term each day varies depending on activity in the facility for the respective day. It is noted that the described video segments may comprise any length of video, such as five-minute intervals of video data received from the camera(s).

FIG. 4 also illustrates a user 406 operating a client computing device 408 for issuing one or more requests to store sensor data for a longer amount of time than the default amount of time. As illustrated, the client computing device 408 may receive input from the user 406 and may interact with a manual-archiving module 410 based on this input. For instance, the user 406 may request, via the device 408, to store video data at a particular location in the facility (or all locations in the facility) corresponding to a particular time range.

In each instance, the request from the module 404 or the module 410 may be received by an encoding module 412. The encoding module 412 may determine a state of the facility 102 at the time of the received request and/or a state of the facility at the time range corresponding to the sensor data that is being requested to be stored for the longer term. This information may be stored as store-configuration data in a segment-metadata service 414. The store-configuration data may comprise information such as a pose of the respective camera that acquired the video data being requested to be stored, a field-of-view of that camera, the state of a shelf within the field-of-view of that camera (e.g., whether it was tidy or untidy), and/or the like.

In addition, the encoding module 414 may issue one or more requests to the storage system 402 to store, for an amount of time different than the default amount of time, the sensor data requested by the auto-archiving module 404 or the manual-archiving module 410. In one example, the encoding module 414 sends a query to the storage system 402 asking the storage system 402 what sensor data (e.g., video data) the storage system 402 has stored for the time range of interest (and, potentially, from a particular sensor or at a particular location in the facility). The storage system 402 may analyze its data store to identify the location of any sensor data meeting the criteria specified by the encoding module 412 and may send a list of the corresponding segments back to the encoding module 412. In response, the encoding module 412 may send a request back to the storage system 402 to mark these segments as do-not-delete. Marking the segment as "do-not-delete" may comprise a request to store these segments for an indefinite amount of time or until expiration of a time or date that occurs later in future than the lapse of the default amount of time. In response to receiving this request, the storage system 402 may update the storage of the subject sensor data to ensure it is stored for the greater amount of time. One example manner for doing so is discussed below with reference to FIG. 5.

In addition to the above, sensor data may be designated for storage for an amount of time that is greater than the default amount of time based on application of predefined tags to the sensor data. That is, tags may be automatically or manually applied to certain segments of sensor data. Further, certain tags may be associated with a policy specifying that sensor data associated with the tag(s) is to be stored for the greater amount of time (e.g., indefinitely). For instance, operators of the data-retention system 126 may be interested in sensor data having certain attributes, such as video data showing the interaction of children within the facility 102 (e.g., to see whether they pick items from shelves and move them to other shelves), interaction of users in close proximity to one another (thus making it difficult for the tracking module 346 to track the users accurately when they move apart from one another), or for any other reasons As such, an annotation module 416 may both enable access to the sensor data to human users operating client computing devices and may also automatically analyze the sensor data to apply respective tags to the data. In the former instances, the annotation module 416 may provide a user interface (UI) (e.g., a web-based UI) to allow users to view the sensor data and manually apply tags to the data. In the latter instances, the annotation module 416 may utilize CV techniques or the like (as described above) to identify attributes of the sensor data and may apply tags indicative of these attributes to the sensor data in response. Applying a tag to sensor data may comprise storing an indication of the attribute or tag in the data store 316 in association with the corresponding sensor-data segments.

The data-retention system 126 may further include the evaluation service 358, which may use the archived data 358 to train models associated with certain circumstances that may occur within the facility, such as the presence of children within the facility, two or more users in close proximity with one another during a pick of an item, the exchange of an item between two users within the facility 102, and the like. As illustrated, the evaluation service 358 includes one or more replay and evaluation modules 418, which generate respective evaluation reports 420. In some instances, operators respective for different portions of the inventory management system 120 may generate the respective modules 418 for generating and training different models for identifying the occurrence of different circumstances in the facility. For example, operators responsible for the tracking module 346 may create a first replay and evaluation module 418, operators responsible for the identification module 348 may create a second replay and evaluation module 418, and so forth. In some instances, the operators of these modules may request to store certain portions of sensor data, as described above, based on the desired replay and evaluation modules 418 for that module/service. For example, the operators responsible for the tracking module 346 may create a replay and evaluation module 418 intended to better identify children within the facility. Hence, these operators may request that sensor data associated with the tag "child" be stored for a longer amount of time such that this sensor data may be used to create an evaluation report 420 by the respective replay and evaluation module 418. FIG. 4 illustrates the operators responsible for these different modules as "clients 420". Thus, the clients 420 may access apply tags to the sensor data for storing the sensor data for later training by accessing the annotation module 416 and issuing requests to the apply the tags to the different segments of data.

Figure 5:
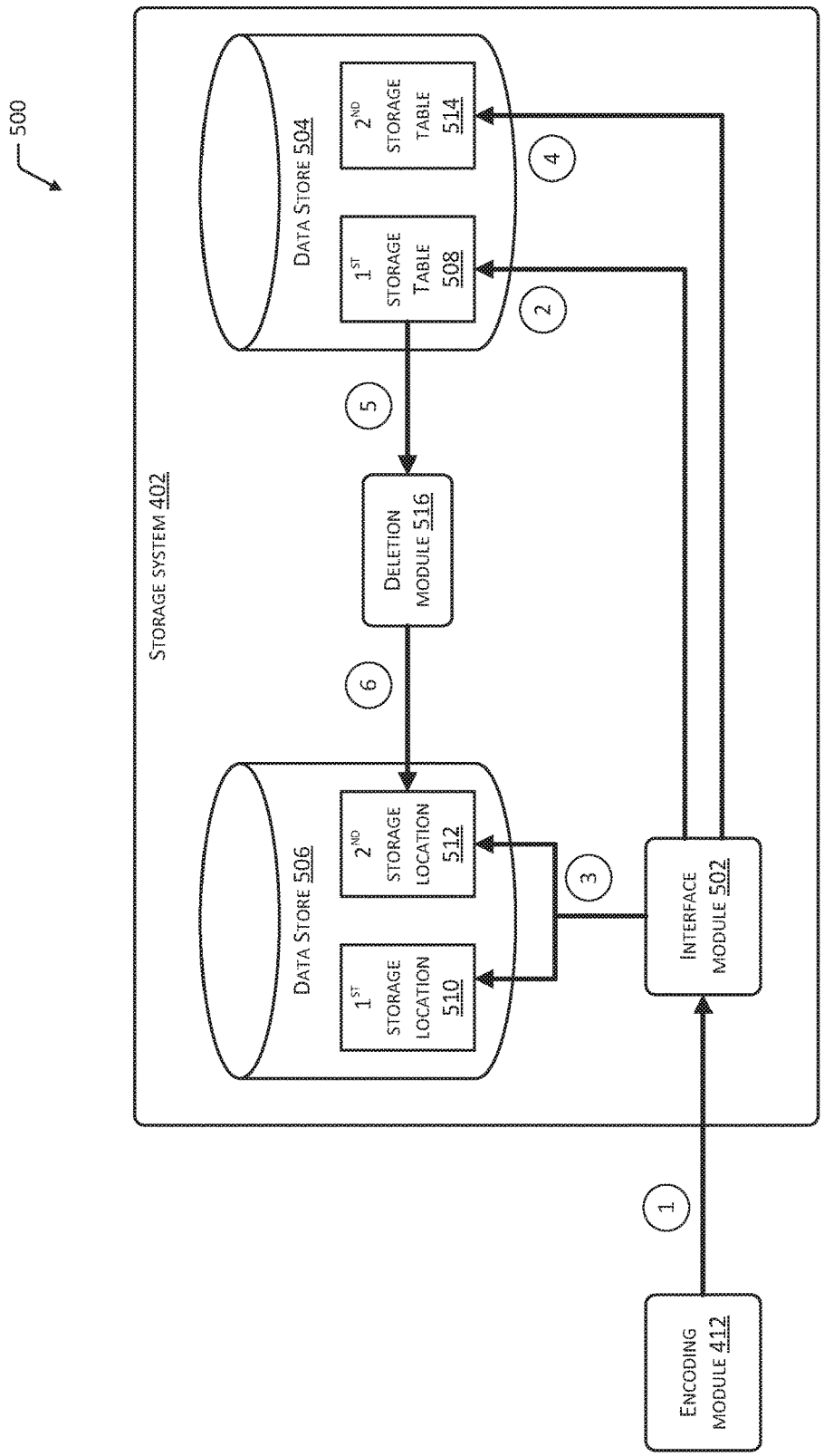
FIG. 5 illustrates a block diagram of an example components of the storage system of the data-retention system from FIG. 4, along with an example flow of operations for retaining data for longer-term storage.

FIG. 5 illustrates a block diagram of an example components of the storage system of the data-retention system from FIG. 4, along with an example flow of operations 500 for retaining data for longer-term storage. At "1", the encoding module 414 issues a request to the storage system 402 to store certain sensor data for an amount of time that is greater than the default amount of time. In some instances, the request simply requests that the indicated sensor data be stored indefinitely, while in other instances the request indicates an expiration date to apply to the sensor data, after which time the sensor data may be delete.

In the illustrated example, an interface module 502 receives the request and, at "2", queries a data store 504 for a location of the specified sensor data in another data store 506. In this example, the data store 504 maintains a first storage table 508 that indicates respective locations of respective sensor data in the data store 506, while the data store 506 stores the actual sensor data. Further, in some instances the data store 506 utilizes two storage locations 510 and 512. The first storage location 510 may comprise the default storage location at which the sensor data is initially stored when initially received from the sensors. That is, upon acquiring the sensor data, the sensors may provide the data to the storage system for storage in the first location 510. In some instances, the first location 510 is associated with a lifecycle policy such that the sensor data stored therein is deleted after a certain amount of time. In one example, data may be deleted ten days (or any other amount of time) after it is stored in the first storage location 510.

After identifying the location of the specified sensor data in the first storage location 510 using the first storage table 508, at "3" the sensor data may be copied from its location(s) in the first storage location 510 to a particular location(s) in the second storage location 512. In this example, the second storage location 512 might not be associated with a default amount of storage time (i.e., a lifecycle policy), meaning that data stored in the second storage location 512 may be stored indefinitely or until expiration of an amount of time specified upon receipt of the request to store the data for the longer period of time.

After storing a copy of the specified sensor data in the particular location(s) of the second storage location 512, at "4" the interface module 502 stores an indication of this location(s) in a second storage table 514. That is, the module 502 updates the second storage table 514 to indicate the location of the specified sensor data in the second storage location 512, such that it is addressable and locatable in the second storage location 512. In the above example, specified sensor data may thus reside in the first storage location 510 while a copy may simultaneously reside in the second storage 512. As such, clients 422 other than the client that requested to store the sensor data for the longer period of time may still locate the sensor data in the first storage location until expiration of the default amount of time. In other instances, however, the interface module may instead alter a property of the sensor data in the first storage location 510 to indicate that the data is not to be deleted upon expiration of the default amount of time, rather than copy the contents of the sensor data from the first storage location 510 to the second storage location 512.

Figure 6:
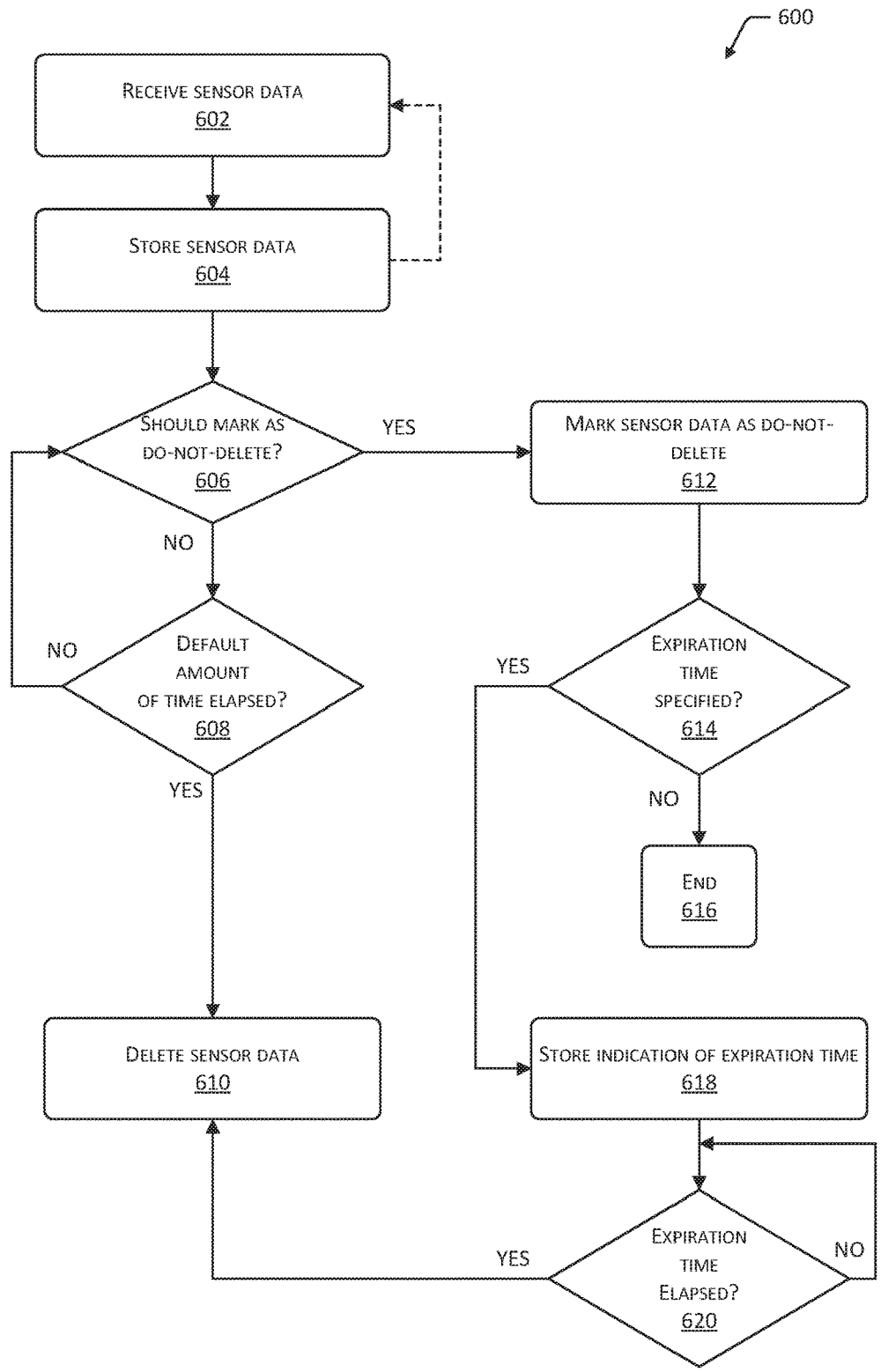
FIG. 6 illustrates a flow diagram of an example process for identifying data to store for a period of time that is greater than a default amount of time.

FIG. 6 illustrates a flow diagram of an example process 600 for identify data to store for a period of time that is greater than a default amount of time. In some instances, the process 600 may be performed by the data-retention system 126 described above. At 602, the data-retention system 126 receives sensor data from one or more sensors within a facility. At 604, the data-retention system 126 stores the sensor data, such as in the first storage location 508 of the data store 504 discussed above. FIG. 6 further illustrates, via the dashed line, that the data-retention system 126 may continually, periodically, or randomly continue receiving sensor data.

At 606, the data-retention system 126 determines whether the received sensor data has been marked as do-not-delete. That is, the data-retention system 126 determines whether the archive service has received a request to refrain from deleting the sensor data and/or to store the sensor data for an amount of time that is greater than a default amount of time. As described above, this request may be received based on a manual input, a particular tag having been applied to the sensor data (manually or automatically), the sensor data having a complexity score that is greater than a threshold, or the like.

If, at 606, the data-retention system 126 determines that the sensor data has not been marked as do-not-delete, then at 608 the data-retention system 126 determines whether the default amount of time has lapsed. That is, the data-retention system 126 may store the sensor data for a default amount of time and, upon elapse of this amount of time, may delete the sensor data to make additional storage space for newer sensor data. For example, the sensor data may have been received on a particular date, and may be deleted a particular amount of time after that date. For instance, at a particular time each day, sensor data older than ten days and not having been marked for deletion may be deleted. At 610, the process 600 illustrates that the default amount of time has elapsed and the data-retention system 126 deletes the sensor data.

If, however, the data-retention system 126 determines at 606 that a request has been received, then at 612 the data-retention system 126 marks the sensor data as do-not-delete. This may include altering a property of the sensor data in the storage location of the sensor data to "do-not-delete", changing an expiration date of the sensor data so it is marked for deletion later than default amount of time, copying the sensor data to a new storage location that does not implement a lifecycle policy (e.g., delete contents more than ten days old), or the like. At 614, the data-retention system 126 determines whether the sensor data, marked for longer-term storage, indicates an expiration time. If not, then at 616 the process 600 ends. If, however, the request does specify an expiration time, then at 618 the data-retention system 126 stores an indication of the expiration time such that the corresponding sensor data will be deleted upon expiration of that time. At 620, the data-retention system 126 continues to determine if the expiration time has lapsed and, if so, deletes the sensor data. This may include deleting the sensor data from its original storage location, from the location to which it was copied to, and/or the like.

Figure 7:
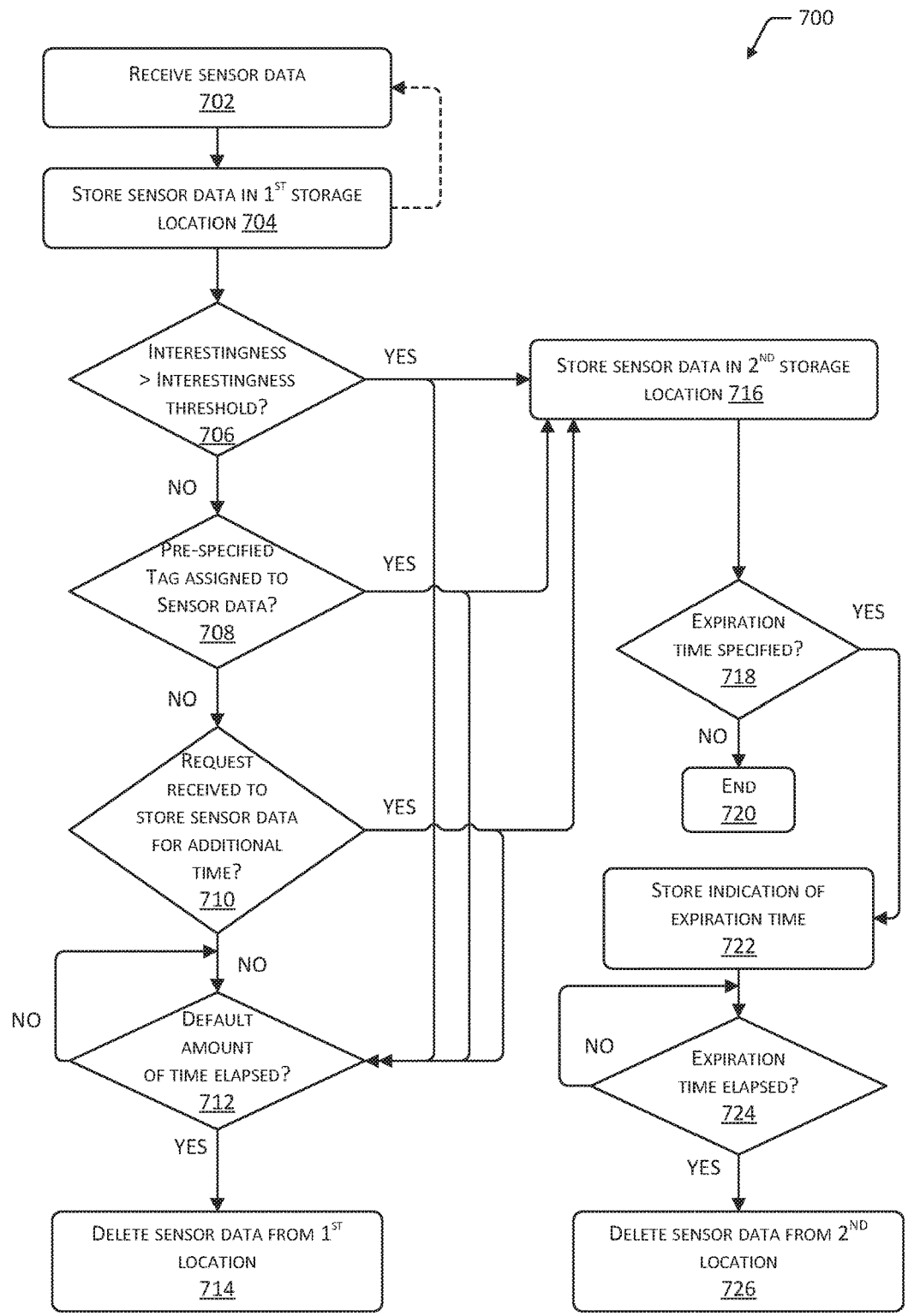
FIG. 7 illustrates a flow diagram of another example process for identifying data to store for a period of time that is greater than a default amount of time.

FIG. 7 illustrates a flow diagram of another example process 700 for identify data to store for a period of time that is greater than a default amount of time. Again, the data-retention system 126 may perform some or all of this process in some instances. At 702, the data-retention system 126 receives sensor data and, at 704, stores the sensor data in a first storage location. Again, the dashed line indicates that the data-retention system 126 may continue to periodically, continuously, or randomly receive sensor data.

At 706, the data-retention system 126 determines an interestingness score associated with the sensor data and determines whether the interestingness score associated with the received portion of sensor data is greater than a threshold interestingness score. For instance, the data-retention system 126 may determine the complexity score of the data, determine the threshold complexity, and determine whether the score is greater than the threshold. As described above, calculating the complexity score may be based on a number of events that took place in the facility during a time corresponding to the sensor data, along with respective confidence levels of these events. Generally, a greater number of events and lesser confidence levels will result in a higher complexity score. That is, the complexity score may be at least partly directly proportional to the number of events associated with the sensor data and at least partly inversely proportional to the confidence levels of the results of these events. Further, and as discussed above, the interestingness score may be determined based on a variety of other factors, such as a number of users represented by the sensor data, whether the data was sent for analysis by one or more human users, whether the sensor data represents a predefined event (e.g., running, yelling, laying down, etc.), whether an event associated with the sensor data was disputed by a customer, or the like.

If the data-retention system 126 determines that the complexity score of the sensor data is not greater than the threshold, then at 708 the data-retention system 126 determines whether the sensor data has been associated with a prespecified tag. That is, the data-retention system 126 determines whether the sensor data has been automatically or manually associated with a tag that is associated with a policy indicating that such sensor data is to be stored for an amount of time that is greater than a default amount of time.

If the data-retention system 126 determines that no such tag has been associated with the sensor data, then at 710 the data-retention system 126 determines whether the data-retention system 126 has received a manual request to store the sensor data. For instance, the data-retention system 126 determines whether a human user has utilized a client computing device to request that sensor data associated with a time of day, date, and location corresponding to the received sensor data be stored for a longer amount of time.

If no such request has been received, then at 712 the data-retention system 126 determines whether the default amount of time has lapsed prior to any of the conditions of 706-710 being met. If the default amount of time elapses prior to any of the conditions of 706-710 being met, then at 714 the data-retention system 126 deletes the sensor data from the first location, such as the first location 508 of the data store 504.

If, however, the data-retention system 126 determines that any of the conditions of 706-710 have been met, then at 716 the data-retention system 126 stores the received sensor data in a second storage location, such as the second storage location 510 of the data store 504. As described above, this may include creating a copy of the sensor data and storing the copy in the second location without otherwise disturbing (e.g., deleting or modifying) the original version of the sensor data in the first location. It is noted that in addition to storing the copy of the sensor data in the second location, the data-retention system 126 also continues to determine when the default amount of time elapses and, when this time lapses, the system 126 deletes the sensor data from the first location.

After storing the copy of the sensor data in the second location, at 718 the data-retention system 126 determines whether an expiration time was specified when the request to store the sensor data for the greater amount of time was received. If not, then at 720 the process 700 ends. If, however, such a time was specified, then at 722 the data-retention system 126 stores an indication of the expiration time in association with the sensor data. For instance, the data-retention system 126 may update the second storage table 514 to indicate this expiration time as discussed above with reference to FIG. 5. Thereafter, at 724 the data-retention system 126 determines when the expiration time lapses and, upon the time lapsing, deletes the sensor data from the second storage location at 726. For instance, the deletion module 516 may be triggered upon occurrence of the expiration time, causing the deletion module 516 to delete the copy of the sensor data from the second storage location 510.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving first sensor data corresponding to a first time range, the first sensor data acquired by one or more sensors in a facility;
   storing the first sensor data in a first storage location for a first amount of time;
   receiving second sensor data corresponding to a second time range, the second sensor data acquired by the one or more sensors;
   storing the second sensor data in the first storage location for the first amount of time;
   determining a first interestingness score of the first sensor data based at least in part on first activity in the facility during the first time range;
   determining a second interestingness score of the second sensor data based at least in part on second activity in the facility during the second time range;
   storing the first sensor data in a second storage location for a second amount of time that is greater than the first amount of time based at least in part on the first interestingness score; and
   determining not to retain the second sensor data in the second storage location for the second amount of time based at least in part on the second interestingness score.

2. The method as recited in claim 1, wherein the first sensor data and second sensor data are associated with a particular date, the first storage location is associated with a lifecycle policy indicating that sensor data is to be deleted after the first amount of time from initial storage, and further comprising:
   determining that the first amount of time has elapsed since the particular date;
   deleting the first sensor data from the first storage location; and
   deleting the second sensor data from the first storage location.

3. The method as recited in claim 1, further comprising:
   comparing the first interestingness score to a threshold interestingness;
   comparing the second interestingness score to the threshold interestingness;
   determining that the first interestingness score is greater than the threshold interestingness;
   determining that the second interestingness score is less than the threshold interestingness; and
   determining to store the first sensor data in the second storage location based at least in part on the determining that the first interestingness score is greater than the threshold interestingness;
   and wherein the determining not to retain the second sensor data in the second storage location comprises determining not to retain the second sensor data in the second storage location based at least in part on the determining that the second interestingness score is less than the threshold interestingness.

4. The method as recited in claim 1, wherein the determining the first interestingness score based at least in part on the first activity comprises calculating a first complexity score based at least in part on an event that occurred with the facility during the first time range and a confidence level associated with a result of the event, wherein the first complexity score is at least partly inversely proportional to the confidence level associated with the result of the event.

5. The method as recited in claim 1, further comprising:
   receiving third sensor data corresponding to a third time range, the third sensor data acquired by the one or more sensors;
   storing the third sensor data in the first storage location;
   receiving a request from a client computing device to store the third sensor data for more than the first amount of time; and
   storing the third sensor data in the second storage location.

6. The method as recited in claim 1, further comprising:
   receiving third sensor data corresponding to a third time range, the third sensor data acquired by the one or more sensors;
   storing the third sensor data in the first storage location;
   receiving a request from a client computing device to associate a tag with the third sensor data;
   determining that the tag is associated with a policy indicating that data associated with the tag is to be stored for greater than the first amount of time; and
   storing the third sensor data in the second location.

7. The method as recited in claim 1, further comprising:
   receiving third sensor data corresponding to a third time range, the third sensor data acquired by the one or more sensors;
   storing the third sensor data in the first storage location;
   analyzing the third sensor data using one or more computer-vision (CV) algorithms to identify an attribute of the third sensor data;
   storing an indication that the third sensor data is associated with the attribute;
   determining that the attribute is associated with a policy indicating that data associated with the attribute is to be stored for greater than the first amount of time; and
   storing the third sensor data in the second location.

8. The method as recited in claim 1, further comprising:
   storing an indication that the first sensor data stored in the second storage location is associated with the second amount of time that expires after expiration of the first amount of time;
   determining that the first amount of time has elapsed since the storing of the first sensor data in the first location;
   deleting the first sensor data from the first storage location; and
   deleting the first sensor data from the second storage location upon expiration of the second amount of time.

9. A system comprising:
   one or more processors; and
   one or more computer-readable media storing computer-executable instructions that, when executed, cause the one or more processors to perform acts comprising:
   receiving first sensor data corresponding to a first time range, the first sensor data acquired by one or more sensors in a facility;
   storing the first sensor data in a first storage location for a first amount of time;
   receiving second sensor data corresponding to a second time range, the second sensor data acquired by the one or more sensors;
   storing the second sensor data in the first storage location for the first amount of time;
   determining a first interestingness score of the first sensor data based at least in part on first activity in the facility during the first time range;
   determining a second interestingness score of the second sensor data based at least in part on second activity in the facility during the second time range; and storing the first sensor data in a second storage location for a second amount of time that is greater than the first amount of time based at least in part on the first interestingness score.

10. The system as recited in claim 9, wherein the first sensor data and second sensor data are associated with a particular date, the first storage location is associated with a lifecycle policy indicating that sensor data is to be deleted after the first amount of time from initial storage, and the acts further comprising:
  determining that the first amount of time has elapsed since the particular date;
  deleting the first sensor data from the first storage location; and
  deleting the second sensor data from the first storage location.

11. The system as recited in claim 9, the acts further comprising:
  comparing the first interestingness score to a threshold interestingness;
  comparing the second interestingness score to the threshold interestingness;
  determining that the first interestingness score is greater than the threshold interestingness;
  determining that the second interestingness score is less than the threshold interestingness; and
  determining to store the first sensor data in the second storage location based at least in part on the determining that the first interestingness score is greater than the threshold interestingness.

12. The system as recited in claim 9, wherein the determining the first interestingness score based at least in part on the first activity comprises calculating a first complexity score based at least in part on an event that occurred with the facility during the first time range and a confidence level associated with a result of the event, wherein the first complexity score is at least partly inversely proportional to the confidence level associated with the result of the event.

13. The system as recited in claim 9, the acts further comprising:
  receiving third sensor data corresponding to a third time range, the third sensor data acquired by the one or more sensors;
  storing the third sensor data in the first storage location;
  receiving a request from a client computing device to store the third sensor data for more than the first amount of time; and
  storing the third sensor data in the second storage location.

14. The system as recited in claim 9, the acts further comprising:
  receiving third sensor data corresponding to a third time range, the third sensor data acquired by the one or more sensors;
  storing the third sensor data in the first storage location;
  receiving a request from a client computing device to associate a tag with the third sensor data;
  determining that the tag is associated with a policy indicating that data associated with the tag is to be stored for greater than the first amount of time; and
  storing the third sensor data in the second location.

15. The system as recited in claim 9, the acts further comprising:
  receiving third sensor data corresponding to a third time range, the third sensor data acquired by the one or more sensors;
  storing the third sensor data in the first storage location;
  analyzing the third sensor data using one or more computer-vision (CV) algorithms to identify an attribute of the third sensor data;
  storing an indication that the third sensor data is associated with the attribute;
  determining that the attribute is associated with a policy indicating that data associated with the attribute is to be stored for greater than the first amount of time; and
  storing the third sensor data in the second location.

16. One or more non-transitory computer-readable media storing computer-executable instructions that, when executed, cause one or more processors to perform acts comprising:
  receiving first sensor data corresponding to a first time range, the first sensor data acquired by one or more sensors in a facility;
  storing the first sensor data in a first storage location for a first amount of time;
  receiving second sensor data corresponding to a second time range, the second sensor data acquired by the one or more sensors;
  storing the second sensor data in the first storage location for the first amount of time;
  determining a first interestingness score of the first sensor data based at least in part on first activity in the facility during the first time range;
  determining a second interestingness score of the second sensor data based at least in part on second activity in the facility during the second time range; and
  storing the first sensor data in a second storage location for a second amount of time that is greater than the first amount of time based at least in part on the first interestingness score.

17. The one or more non-transitory computer-readable media as recited in claim 16, wherein the first sensor data and second sensor data are associated with a particular date, the first storage location is associated with a lifecycle policy indicating that sensor data is to be deleted after the first amount of time from initial storage, and the acts further comprising:
  determining that the first amount of time has elapsed since the particular date;
  deleting the first sensor data from the first storage location; and
  deleting the second sensor data from the first storage location.

18. The one or more non-transitory computer-readable media as recited in claim 16, the acts further comprising:
  comparing the first interestingness score to a threshold interestingness;
  comparing the second interestingness score to the threshold interestingness;
  determining that the first interestingness score is greater than the threshold interestingness;
  determining that the second interestingness score is less than the threshold interestingness; and
  determining to store the first sensor data in the second storage location based at least in part on the determining that the first interestingness score is greater than the threshold interestingness.

19. The one or more non-transitory computer-readable media as recited in claim 16, wherein the determining the first interestingness score based at least in part on the first activity comprises calculating a first complexity score based at least in part on an event that occurred with the facility during the first time range and a confidence level associated with a result of the event, wherein the first complexity score is at least partly inversely proportional to the confidence level associated with the result of the event.

20. The one or more non-transitory computer-readable media as recited in claim 16, the acts further comprising:
receiving third sensor data corresponding to a third time range, the third sensor data acquired by the one or more sensors;
storing the third sensor data in the first storage location;
receiving a request from a client computing device to store the third sensor data for more than the first amount of time; and
storing the third sensor data in the second storage location.

21. A method comprising:
storing sensor data corresponding to a time range in a first storage location for a first amount of time, the sensor data generated by one or more sensors in a facility;
determining to store the sensor data in at least one of the first storage location or a second storage location for a second amount of time that is different than the first amount of time based at least in part on activity occurring in the facility during the time range; and
storing the sensor data in the at least one of the first storage location or the second storage location for the second amount of time.

22. A method comprising:
storing sensor data corresponding to a time range in a first storage location for a first amount of time, the sensor data generated by one or more sensors in a facility; and
storing the sensor data in at least one of the first storage location or a second storage location for a second amount of time that is different than the first amount of time based at least in part on activity occurring in the facility during the time range.

* * * * *